L. H. BULLARD.
SELECTIVE COUPLING.
APPLICATION FILED JULY 12, 1921.

1,422,536.

Patented July 11, 1922.
2 SHEETS—SHEET 1.

WITNESS

INVENTOR
LESTER H. BULLARD
BY
his ATTORNEYS

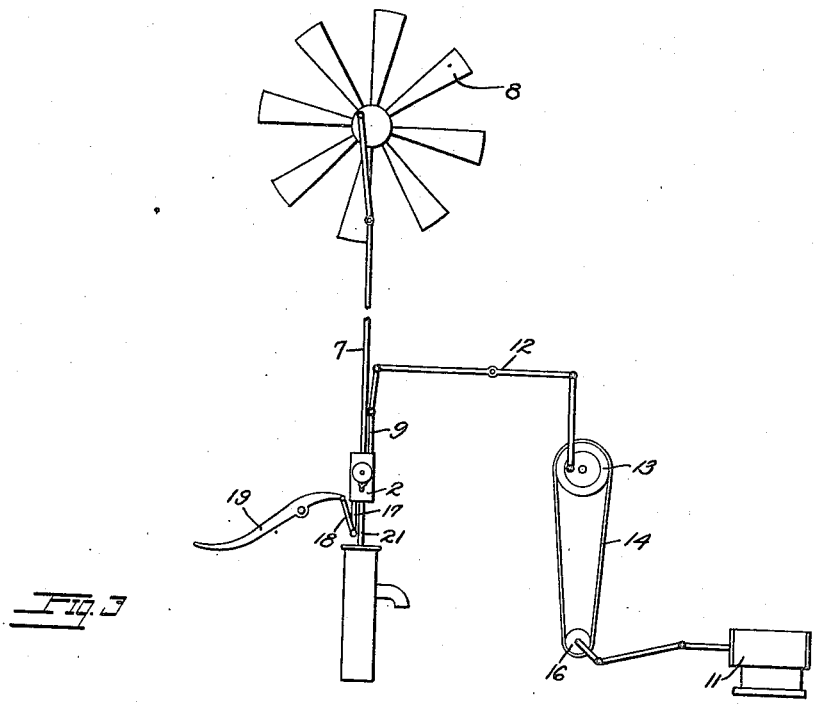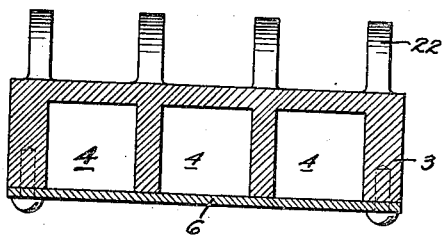

UNITED STATES PATENT OFFICE.

LESTER H. BULLARD, OF SAN LEANDRO, CALIFORNIA.

SELECTIVE COUPLING.

1,422,536. Specification of Letters Patent. Patented July 11, 1922.

Application filed July 12, 1921. Serial No. 484,081.

*To all whom it may concern:*

Be it known that I, LESTER H. BULLARD, a citizen of the United States of America, and a resident of San Leandro, county of Alameda, and State of California, have invented a new and useful Selective Coupling, of which the following is a specification.

My invention relates to couplings for connecting a driving element to a driven element.

An object of the invention is to provide a selective coupling which may be interposed between a driven element and a plurality of driving elements so that the driven element may be actuated by any one of the driving elements.

Another object of the invention is to provide a selective coupling of the character described characterized by simplicity and perfect safety to the operator.

My invention possesses other objects and features of advantage, some of which, with the foregoing, will be set forth in the following description of my invention. It is to be understood that I do not limit myself to the showing made by the said description, as I may adopt variant forms of my invention within the scope of the claims.

Figure 1:
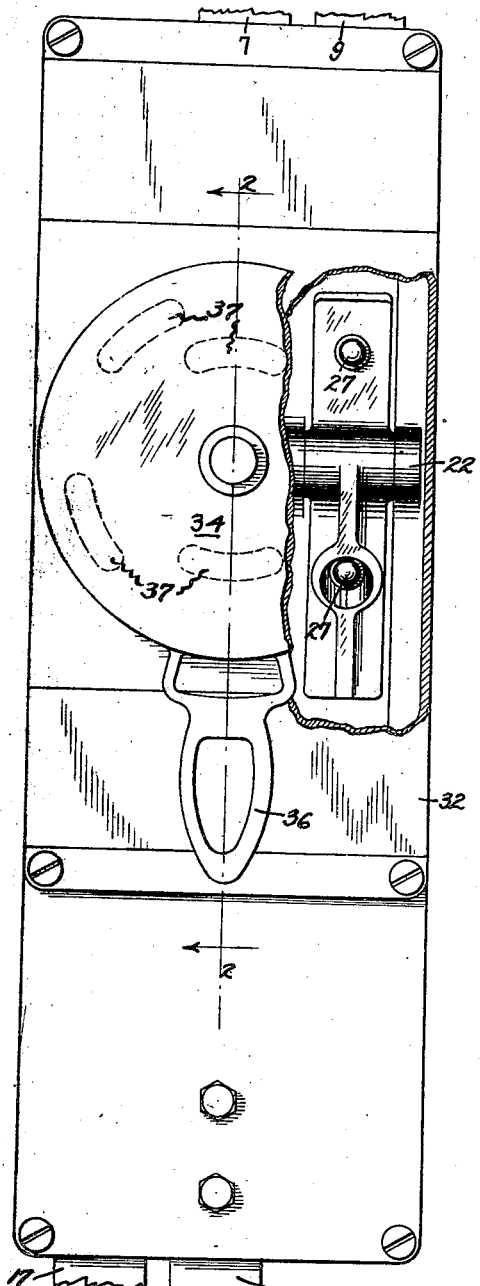
Figure 2:
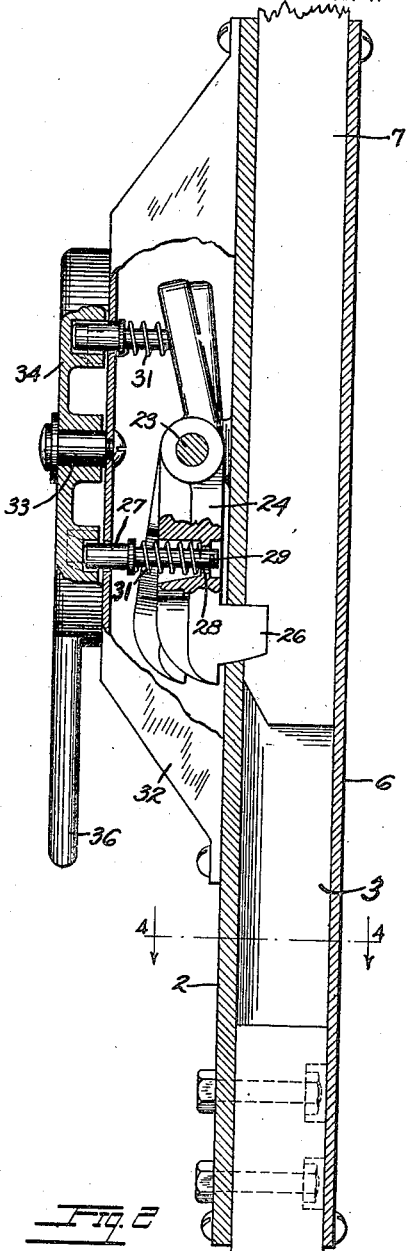

In the drawings, Fig. 1 is a front elevation of the device of my invention as particularly adapted for use with a windmill operating a pump, and where a small auxiliary motor or engine is also provided to drive the pump and where it is sometimes desirable to operate the pump by hand. Fig. 2 is a vertical sectional view taken on the line 2—2 of Fig. 1. Fig. 3 is an elevation largely in diagram showing the complete installation. Fig. 4 is a horizontal sectional view taken on the line 4—4 of Fig. 2.

In the present application I shall describe my invention as applied to the windmill installation above referred to, but it is obvious that it may also be applied to other mechanisms where similar results are to be obtained.

In general terms the coupling of my invention comprises a head secured to the driven element and in which the driving elements are slidably arranged. For each one of the driving elements there is a latch arranged on the head and means are provided for moving these latches so that any desired driving element may be locked to the head by the associated latch, all other latches at the same time being in neutral or disengaged position. The operation of the latches is controlled by a pivoted plate formed with a handle thereon. Movement of the plate to an indicated position automatically effects the desired movement of the latches.

More particularly my selective coupling comprises a head 2 formed on the rear with ribs or flanges 3 between which lie the three channels 4 in which three driving elements are slidably enclosed by the cover plate 6. In the present instance the three driving elements consist of the wheel shaft 7 which, as shown in Fig. 3, is connected in the usual way with the wind wheel 8; the motor shaft 9 actuated in any suitable way by the gas engine or motor 11, such for instance as by the walking beam 12 actuated by the pulley 13 driven by belt 14 on a pulley 16 on the engine or motor shaft; and the shaft 17 connected by the the link 18 with the manually operated handle 19. The head 2 is rigidly fixed to the pump shaft 21, the upper end of which is preferably socketed in the lower portion of the middle channel 4.

Formed on the front of the head are lugs 22 in which is mounted the shaft 23. There is a lug opposite each of the flanges 3, and between each pair of lugs, and therefore opposite each channel 4, a latch lever 24 is journalled on the shaft. There is therefore a latch lever associated with each of the driving elements 7, 9, and 17 and these latch levers are attached to the head and move with it.

The lower end of each latch lever is formed with a lug 26 adapted to be engaged with a correspondingly formed recess in the associated driving element as shown in Fig. 2. The upper end of the latch lever is bent outwardly so that each latch lever may be turned on its shaft to engage the lower end in the associated driving element or to lie in the neutral position in which the lower end is disengaged. Each end of each lever is provided with a stud 27. The stud is loosely mounted in a thin web 28 formed in the lever and is prevented from disengagement by a cotter pin 29 on one side and a spring 31 on the other side which, being interposed between the web and the head of the stud, tends to keep the stud in erect position upon the lever. Each stud is therefore resiliently connected to the lever and is universally movable thereon. The outer end of each stud projects loosely through the top wall of the housing 32 which overlies the latch levers and is secured by suitable screws to the head.

Means are provided for actuating the studs to resiliently press the levers into the desired position, that is, with the selected lever in engagement with the associated driving element and the other levers in neutral position. Rotatably mounted on the stud 33 fixed on the housing 32 is a plate 34 adapted to be turned by means of the handle 36. On the under side of the plate are formed a number of cams 37, one for each of the studs. The cams are arranged in pairs and so proportioned that when the stud 27 at one end of a lever is pressed inwardly, the stud at the other end of that lever is permitted to move outwardly and vice versa. In the position of parts shown in Fig. 1 the stud 27 at the lower end of the middle latch lever 24 has been pressed inwardly to seat the end of the lever in the recess in the lower end of the wheel shaft 7. The upper studs 27 of the other latch levers are in similar position, so that these latch levers are held in neutral position. The upper stud 27 of the middle latch lever as shown in Fig. 2 has been permitted to move outwardly and the lower studs of the other or outside latch levers are in similar position. With the parts in the positions shown, the pump shaft 21 is being reciprocated by the wheel shaft 7. If the wind fails and it is desired to operate the pump with the motor the handle 36 is pulled to the right. The lower stud of the middle latch and the upper stud of the outer latch are now permitted to move backwardly, and the lower stud of the outer latch and the upper stud of the middle latch are depressed, placing their springs in compression. Thus the middle latch disengages and moves to neutral position as soon as the binding load between the parts is removed and the outer latch drops into engagement with its associated shaft 9 as soon as the recess in the shaft is in alinement with the lever. The pump shaft is now connected for operation by the motor shaft 9, the wheel shaft 7 being disconnected. If it is desired to operate the pump shaft by hand the handle 36 is moved to the left whereupon the latch lever associated with the handle shaft 17 is engaged in the manner already made clear and the other two latch levers are held in neutral position.

The wheel shaft 7 and motor shaft 9 are usually more conveniently connected from the top, but the handle shaft, because of its connection with the manually operated handle, is usually more conveniently connected from the bottom. It will be understood of course that the motor shaft may be connected from the bottom if such arrangement is found to be more convenient.

It will be clear, from the above, that my selective coupling may also be applied to a driving shaft from which it is desired to take motion to one of three driven shafts and it will also be understood that I may use my device with a different number of shafts than herein explained without departing from the spirit of my invention.

I claim:

1. The combination with driving and driven shafts of a selective coupling comprising a head secured to one of said shafts and slidably engaged on the other shafts, a latch on said head associated with each of said other shafts, and means for engaging a selected latch with its associated shaft.

2. The combination with driving and driven shafts of a selective coupling comprising a head secured to one of said shafts and slidably engaged on the other shafts, a latch on said head associated with each of said other shafts, and manually operated pivotally mounted means for engaging a selected latch with its associated shaft.

3. The combination with driving and driven shafts of a selective coupling comprising a head secured to one of said shafts and slidably engaged on the other shafts, a latch on said head associated with each of said other shafts, and a manually operated cam plate for engaging a selected latch with its associated shaft.

4. The combination with driving and driven shafts of a selective coupling comprising a head secured to one of said shafts and slidably engaged on the other shafts, a latch on said head associated with each of said other shafts, a pivotally mounted plate adjacent said latches, and cams on said plate for engaging a selected latch with its associated shaft.

5. The combination with driving and driven shafts of a selective coupling comprising a head secured to one of said shafts and slidably engaged on the other shafts, a latch on said head associated with each of said other shafts, means for engaging a selected latch with its associated shaft, and resilient means interposed between said engaging means and said selected latch.

6. The combination with driving and driven shafts of a selective coupling comprising a head secured to one of said shafts and slidably engaged on the other shafts, a latch on said head associated with each of said other shafts, and means for engaging a selected latch with its associated shaft and disengaging any other engaged latch.

7. The combination with driving and driven shafts of a selective coupling comprising a head secured to one of said shafts and slidably engaged on the other shafts, a latch on said head associated with each of said other shafts, a pivotally mounted plate adjacent said latches, and cams on said plate for engaging a selected latch with its associated shaft and disengaging any other engaged latch.

8. The combination with driving and driven shafts of a selective coupling comprising a head secured to one of said shafts and slidably engaged on the other shafts, a plurality of latch levers pivotally mounted on said head, each latch lever being engageable with one of said other shafts, a pivotally mounted plate, and cams on said plate for engaging a selected latch lever with its associated shaft.

9. The combination with driving and driven shafts of a selective coupling comprising a head secured to one of said shafts and slidably engaged on the other shafts, a plurality of latch levers pivotally mounted on said head, each latch lever being engageable with one of said other shafts, and means for engaging a selected latch lever with its associated shaft.

10. The combination with driving and driven shafts of a selective coupling comprising a head secured to one of said shafts and slidably engaged on the other shafts, a plurality of latch levers pivotally mounted on said head, each latch lever being engageable with one of said other shafts, a resiliently mounted stud at each end of each latch lever, and cam means engageable with said studs for engaging a selected latch lever with its associated shaft.

11. The combination with driving and driven shafts of a selective coupling comprising a head secured to one of said shafts and slidably engaged on the other shafts, a plurality of latch levers pivotally mounted on said head, each latch lever being engageable with one of said other shafts, a resiliently mounted stud at each end of each latch lever, a manually operated plate pivotally mounted on said head and cams on said plate engageable with said studs for engaging a selected latch lever with its associated shaft and disengaging any other engaged latch lever.

In testimony whereof, I have hereunto set my hand.

LESTER H. BULLARD.